WAVEGUIDE DEVICE HAVING THE ACTION OF A MAGIC TEE

Filed Aug. 10, 1966 3 Sheets-Sheet 1

WAVEGUIDE DEVICE HAVING THE ACTION OF A MAGIC TEE

INVENTORS
TAKESHI KAWAHASHI
BY SUSUMU KITAZUME

Mann + Jangarathis
ATTY'S

United States Patent Office 3,509,494
Patented Apr. 28, 1970

3,509,494

WAVEGUIDE DEVICE HAVING THE ACTION OF A MAGIC TEE

Takeshi Kawahashi and Susumu Kitazume, Tokyo, Japan, assignors to Nippon Electric Company, Limited, Tokyo, Japan Filed Aug. 10, 1966, Ser. No. 571,605
Claims priority, application Japan, Aug. 11, 1965, 40/48,894
Int. Cl. H01p *5/12*
U.S. Cl. 333—11 20 Claims

ABSTRACT OF THE DISCLOSURE

Waveguide apparatus having the action of a magic tee is provided wherein such apparatus may be utilized in accordance with the various teachings and embodiments of this invention as a magic tee, a frequency converter, a frequency discriminator, or a detector for transmitting high frequency, electromagnetic waves. The waveguide apparatus according to this invention comprises a tube which is formed at least at its inside surface of electrically conductive material and is provided with an opening in at least one side wall thereof so as to preclude electromagnetic coupling between said waveguide and opening. Such apparatus has been found to be highly advantageous in use because its unique structure reduces the length of the electrically equivalent arms to zero thereby allowing the load elements, the crystal detectors or other non-linear elements used in the various embodiments hereof to reside within the tube itself whereby the resulting waveguide apparatus is small in size, simple in shape and highly compact.

This invention relates to a microwave waveguide device having an electric action similar to that of a magic tee and, more specifically, to such device embodied in a frequency converter, a frequency discriminator, or a detector for transmitting high frequency, electromagnetic waves.

A conventional magic tee comprising four arms, namely, an E arm, an H arm, and two electrically equivalent arms is complicated in shape and large in size. A frequency converter comprising such a magic tee has been found to have the disadvantages of not only being large in size, irrespective of the fact that an intermediate-frequency amplifier included in the frequency converter is transistorized and consequently is miniaturized, but also having a large distance between the crystal detectors or other nonlinear circuit elements mounted in the two electrically equivalent arms, respectively, of the magic tee. This large distance has inevitably lengthened the connection between the crystal detectors and thereby has deteriorated the frequency characteristic of the frequency converter.

A primary object of the present invention is therefore to provide a waveguide device having the action of a magic tee and yet is simple in shape and small in size.

An additional object of the invention is to provide a microwave frequency converter or discriminator of simple construction and small dimensions.

According to this invention, there is provided a waveguide device having the action of a magic tee and comprising a tube which is made of electric conductive material at least at its inside surface and which is provided with an opening in one side wall so as not to couple the electromagnetic field with the tube.

This waveguide device not only serves as a magic tee as will later be described in conjunction with the several embodiments of the invention, but also is small in size and simple in shape because the length of the electrically equivalent arms is zero. This is not the case with a conventional magic tee. This waveguide device provides a balanced frequency converter which is small-sized and prevents deterioration of the frequency characteristic by virtue of the fact that the distance between the two crystal detectors is smaller than the maximum diameter of the waveguide and the additional fact that the wire for coupling the latter two detectors is consequently short. Furthermore, two such waveguide devices may be so brought together as to form a frequency discriminator whose dimension is not greater in one direction than the maximum dimension of the two waveguide devices. This provides a frequency discriminator which is simple in shape and small in size.

The present invention is hereinafter explained with reference to the accompanying drawing in which.

Figure 7:
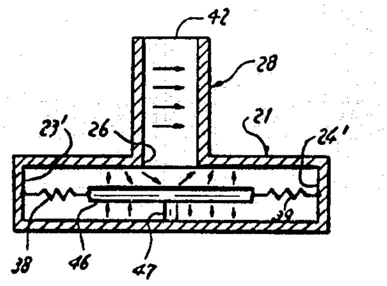
Figure 2:
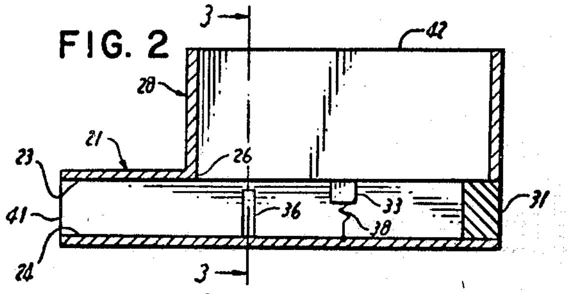
FIG. 2 is a longitudinal sectional view taken on line 2—2 in FIG. 1.
Figure 3:
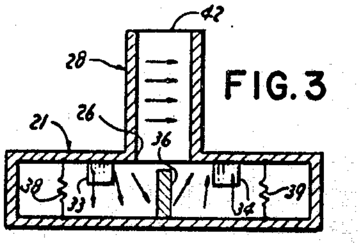
FIG. 3 is a cross-sectional view taken on line 3—3 of FIG. 2.
Figure 4:
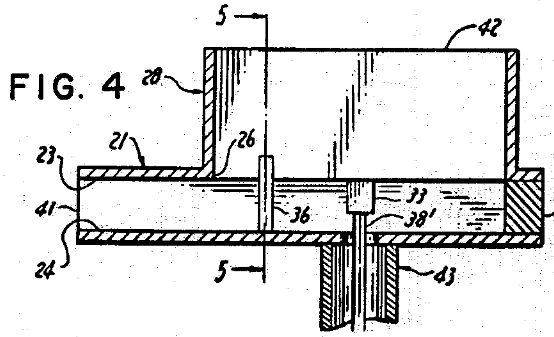
FIG. 4 is a longitudinal sectional view, similar to FIG. 2, of a second embodiment of this invention.
Figure 5:
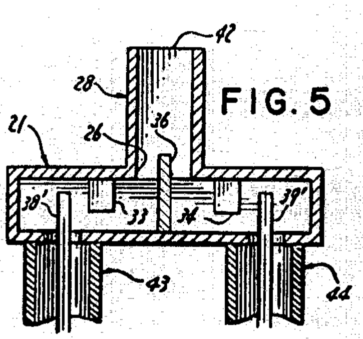
FIG. 5 is a cross-sectional view taken on line 5—5 of FIG. 4.
Figure 6:
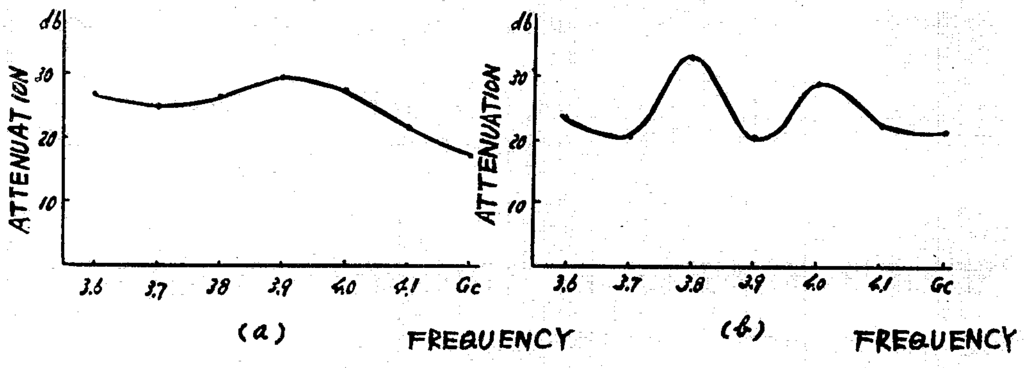
Figure 8:
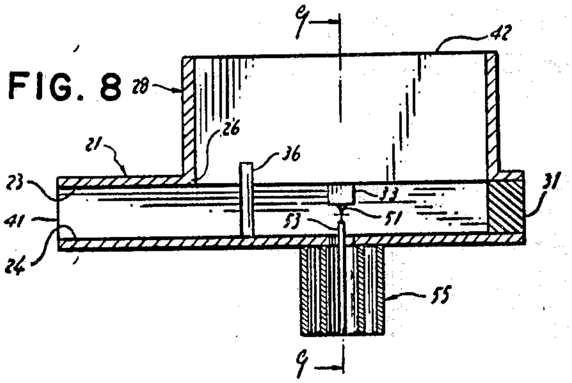
Figure 9:
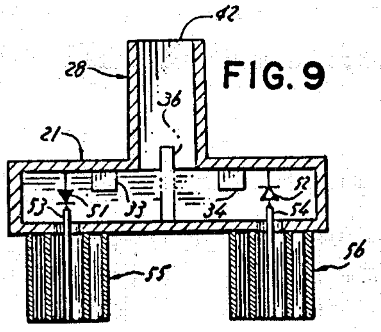
Figure 10:
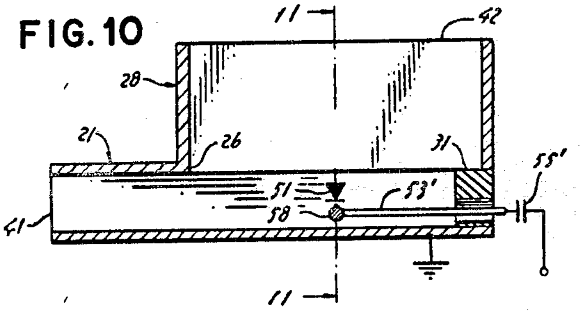
Figure 11:
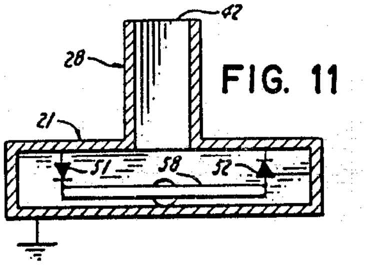
Figure 12:
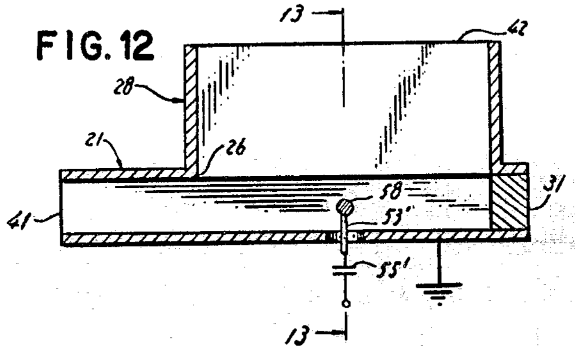
Figure 13:
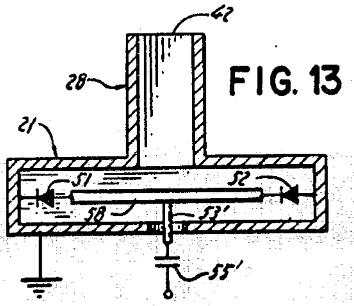
Figures 14, 15:
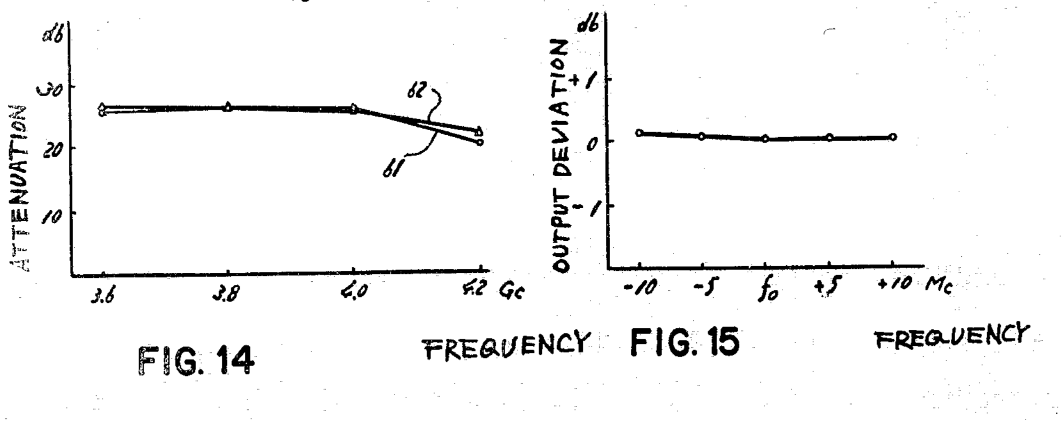
Figure 16:
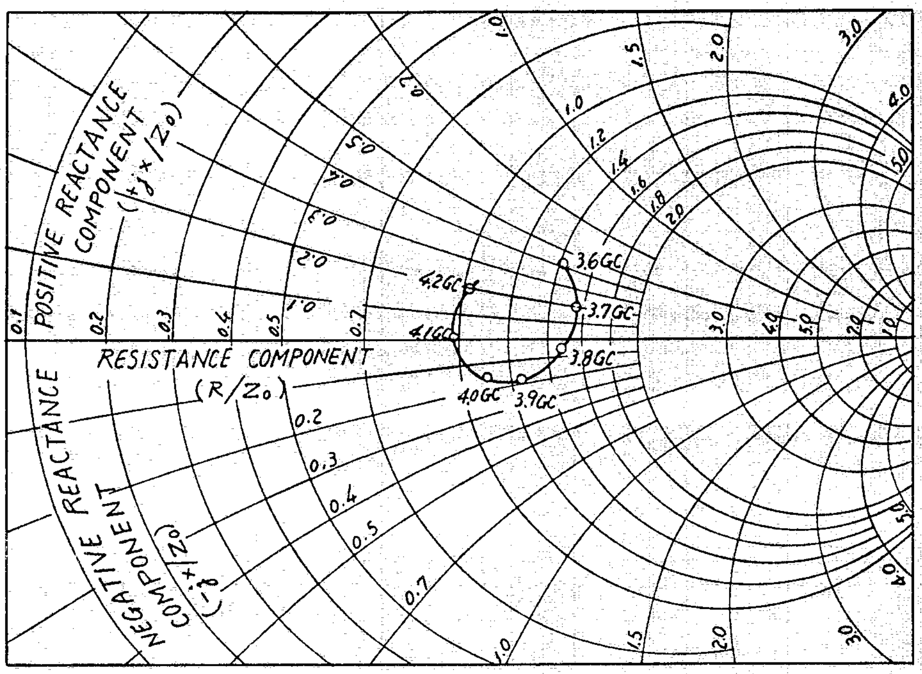
Figure 17:
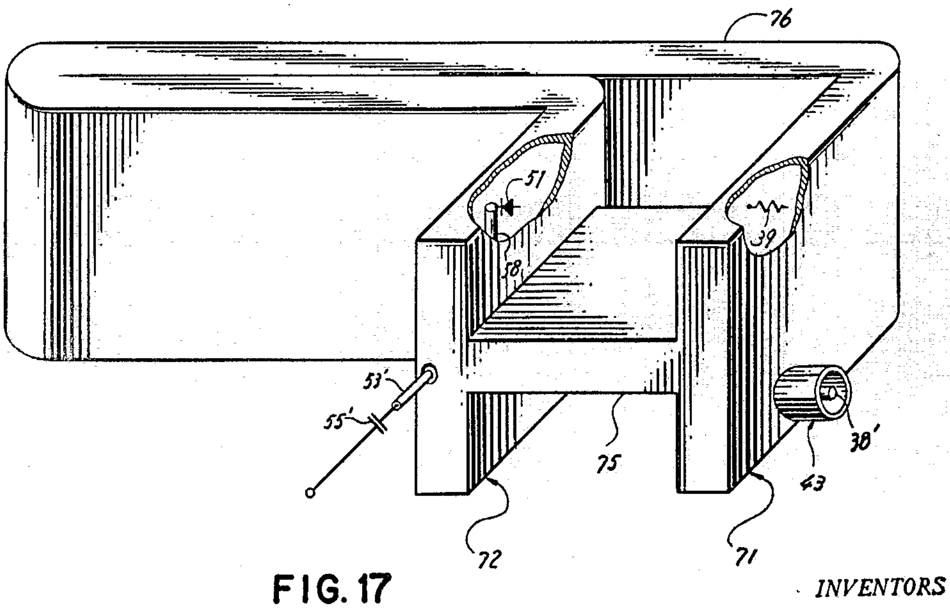

FIGS. 6(*a*) and (*b*) are curves showing the results of an actual observation and illustrating that the second embodiment in FIGS. 4 and 5 has magic tee action;

FIG. 7 is a cross-sectional view, similar to FIG. 3 or 5, of a third embodiment of this invention;

FIG. 8 is a longitudinal sectional view, similar to FIG. 2 or 4, of a fourth embodiment of this invention;

FIG. 9 is a cross-sectional view taken on line 9—9 of FIG. 8;

FIG. 10 is a longitudinal sectional view, similar to FIG. 2, 4, or 8, of a fifth embodiment of this invention;

FIG. 11 is a cross-sectional view taken on line 11—11 of FIG. 10;

FIG. 12 is a longitudinal sectional view, similar to FIG. 2, 4, 8, or 10, of a sixth embodiment of this invention;

FIG. 13 is a cross-sectional view taken on line 13—13 of FIG. 12;

FIGS. 14 through 16 are curves showing characteristics measured with a microwave balanced modulator in which this invention is embodied; and FIG. 17 is a perspective view partly broken away, showing a seventh embodiment of this invention.

Figure 1:
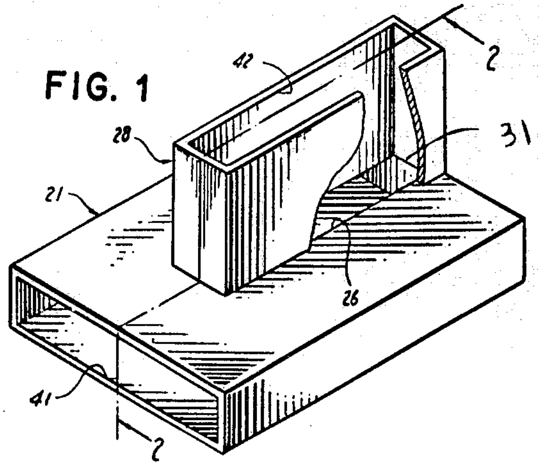
FIG. 1 is an isometric projection, partly cut away, of a first embodiment of the invention.

Referring to FIGS. 1 through 3, a first waveguide device of this invention comprises: a rectangular main waveguide 21; a rectangular opening 26, for example, formed adjacent to one end of a broad wall 23 of waveguide 21 along the center line of broad wall 23 and long in the direction of the center line; a branch waveguide 28 whose cross section of the inside space is identical to the shape and size of opening 26. Branch waveguide 28 is attached to broad wall 23 to dispose its internal opening in correspondence with opening 26 and to extend outwardly perpendicularly from the exterior surface of the latter wall. A short-circuit plate 31 is placed within main waveguide 21 in the neighborhood of one end in the direction of another axis of opening 26. Metallic tabs 33 and 34, small in size in comparison with the size of opening 26, are attached to the internal surface of broad wall 23 to project inwardly therefrom in an electrically symmetric relation to each other with respect to a center plane including the center line of the broad wall 23 and in a plane which passes through the center of opening 26 and is perpendicular to the center line of the main waveguide. A metal rod 36, having a small diameter and a length of the order of the distance between broad walls 23 and 24, is attached to an internal surface of broad wall 24 to project inwardly therefrom on the above-mentioned center plane at a position spaced from metal tabs 33 and 34 in a directional sense opposite to short-circuit plate 31. Resistors 38 and 39 attached at both ends to the internal surfaces of broad walls 23 and 24 project perpendicularly therebetween in an electrically symmetric relation to each other with respect to the aforesaid center plane and in the plane in which the metal tabs 33 and 34 are disposed. The position of short-circuit plate 31, the dimensions and the positions of metal tabs 33 and 34, and the dimensions and position of metal rod 36 are empirically determined so that matched impedance relations may be established between main waveguide 21 and opening 26 or branch waveguide 28 and between them and the resistors 38 and 39 serving as loads. These matched impedance relations are easily attained by using as main waveguide 21 a flat waveguide which has a large ratio, such for example, as 4.8 to 1, of broad wall 23 or 24 to its associated narrow wall. The respective positions of resistors 38 and 39 are also empirically determined so that these loads may be matched from an impedance standpoint. An end opening 41 of main waveguide 21 and side opening 26 or an end opening 42 of branch waveguide 28 serve as the input and the output terminals of the waveguide device in a manner which is subsequently mentioned.

Particularly referring to FIG. 3, microwaves entering the waveguide device at end opening 42 and being mainly in the $H_{10}$ mode with electric fields in the direction shown by the arrows are transmitted through branch waveguide 28 to opening 26. Oscillating electromagnetic field components induced within main waveguide 21 at the vicinity of opening 26 in mutually opposite phases on the respective sides of the axis of the latter opening and corresponding to the opposite phase oscillations induced in the electrically equivalent arms, respectively, of a conventional magic tee, not shown, are absorbed in resistors 38 and 39 and as a consequence are not transmitted to end opening 41 of main waveguide 21. On the other hand, other microwaves transmitted into the waveguide device at end opening 41 and being substantially in the $H_{10}$ mode so as to reach resistors 38 and 39 in phase are absorbed thereby and as a consequence do not travel through opening 26 to branch waveguide 28. This corresponds to such phenomena in a conventional magic tee, not shown, that microwaves sent thereinto through the E arm do not appear in the H arm, but appear in opposite phases in other arms perpendicular to such E and H arms and that other microwaves sent into the magic tee through the H arm do not appear in the E arm, but do appear in phase in other arms perpendicular to such E and H arms.

Referring to FIGS. 4 and 5, and also to FIGS. 6(*a*) and (*b*) wherein the abscissae represent frequency and the ordinates represent attenuation, a second waveguide device of this invention comprises, instead of the resistors 38 and 39 of the first embodiment as explained with reference to FIGS. 1 through 3, microwave coaxial cables 43 and 44 are attached to an outer surface of broad wall 24 to extend outwardly therefrom and normally thereto in such positions that end portions of inner conductors 38' and 39' extend inwardly into the interior of main waveguide 21 from the above-mentioned broad wall 24 to terminate in proximity of the inner surface of the other broad wall 23 at the positions of resistors 38 and 39, respectively, in FIG. 3. Now, microwaves sent into the waveguide device of FIGS. 4 and 5 from left-side microwave coaxial cable 43 appear at end opening 41 of main waveguide 21 and at the end opening 42 of branch waveguide 28 with a difference in power which is inconsequential and which causes no trouble in a practical electric circuit. The input microwaves appear in right-side coaxial cable 44 with substantial attenuation as illustrated in FIG. 6(*a*). This corresponds to such phenomena in a conventional magic tee that microwaves entering thereinto from one of the two electrically equivalent arms do not appear in the other of the latter two arms, but are equally shared by the E and the H arms. Incidentally, other microwaves sent into the waveguide device of FIGS. 4 and 5 from end opening 41 of main waveguide 21 appear with substantial attenuation as shown in FIG. 6(*b*) at opening 26 or at end opening 42 of branch waveguide 28 and are shared by both coaxial cables 43 and 44 with a difference in power which is immaterial in practice.

Referring to FIG. 7, a third waveguide device of this invention comprises, in place of the matching elements 33, 34 and 36 described with reference to FIGS. 1 through 3; a matching member consisting of a metallic rod 46 extended in parallel relation with both of broad walls 23 and 24, and a metal stud 47 supporting rod 46 on broad wall 24 in such a manner that metallic rod 46 is placed intermediate of broad walls 23 and 24 and connected to adjacent ends of resistors 38 and 39 whose opposite ends are connected to narrow walls 23' and 24', respectively. As will be appreciated, it is obvious to modify in various manners the shape of the matching elements and the means for coupling the waveguide device with the load.

In connection with waveguide devices of this invention so far explained, it is understood that the form of side opening 26 in main waveguide 21 may be a circle or a shape similar to the square, provided main waveguide 21 and side opening 26 or branch waveguide 28 are not furnished with electromagnetic coupling therebetween, so long as the wavelength and mode of the microwaves to be dealt with are concerned. Also, it is recognized that branch waveguide 28 may have zero length. Furthermore, the shape of the cross section of main waveguide 21 and the position of side opening 26 therein are optional insofar as they are not electromagnetically coupled to each other as above mentioned. It is, however, noted that in case main waveguide 21 is a flat waveguide and opening 26 is situated away from the center line of broad wall 23, the loads constituted by resistors 38 and 39 or extended inner conductors 38' and 39' of coaxial cables 43 and 44 must be so positioned as to provide the best possible magic tee action as explained hereinbefore.

Referring to FIGS. 8 and 9, a microwave balanced frequency converter wherein this invention is put into effect comprises, in place of resistors 38 and 39 described with reference to FIGS. 1 through 3: left-side and right-side crystal detectors, or other non-linear circuit elements, 51 and 52, respectively, attached electrically at their one ends to broad wall 23 of main waveguide 21 at the positions of resistors 38 and 39 in FIG. 3 and in reversed polarities, namely, in such polarities that crystal detectors 51 and 52 may be in the same senses, respectively, as the electric field components produced thereat by the microwaves sent thereto from branch waveguide 28; and choke circuits 55 and 56 which allow the intermediate-frequency electromagnetic waves to pass but serve as short circuits for the input microwaves. Each choke circuit comprises outer and intermediate coaxial conductors electrically attached to the outer surface of broad wall 24 of main waveguide 21 to extend outwardly perpendicularly therefrom, and in addition an inner coaxial conductor 53 or 54 projecting through a hole formed in broad wall 24 inwardly of main waveguide 21 and having its free end connected electrically to one of crystal detectors 51 and 52. With this frequency converter, it is possible to send the microwaves to be frequency-converted by the frequency converter through the desired one of end opening 41 of main waveguide 21 or end opening 42 of branch waveguide 28, to transmit the local oscillation power thereto through the other of openings 41 and 42, and to take out the intermediate-frequency output at the free ends of choke circuits 55 and 56. From these circuits, the intermediate-frequency output it supplied to an intermediate-frequency amplifier or other utilization circuit differentially through lead wires, not shown. In operation for transmission, the modulating power is supplied to the choke circuits and the microwave output is taken out at that opening of waveguide openings 41 and 42 to which the local oscillator is not connected.

Referring to FIGS. 10 and 11, a second microwave balanced frequency converter according to this invention is composed by electrically connecting together crystal detectors 51 and 52 within main waveguide 21 by a connection 58 and further by electrically attaching an end of inner conductor 53′ of choke circuit 55′ to connection 58 as illustrated by a capacitive symbol.

Referring to FIGS. 12 and 13, a third microwave balanced frequency converter according to this invention is of such construction that crystal detectors 51 and 52 are substituted for resistors 38 and 39, respectively, described with reference to FIG. 7.

The second and the third balanced frequency converters explained with reference to FIGS. 10 through 13 have such common merit that only one choke circuit 55′ is required in each of the converters. In these frequency converters, coupling wire 58 and that portion of inner conductor 53′ of choke circuit 55′ which is within main waveguide 21 serve, in combination, as an impedance matching member comprising rod 46 and stud 47 as hereinbefore mentioned in connection with FIG. 7. However, it is possible in some cases to further provide any of matching member comprising rod 46 and stud 47 as here- to FIGS. 1 through 3. In the frequency converters of FIGS. 10 through 13, inner conductor 53′ of choke circuit 55′ may pierce through the short-circuit plate 31 or the wall of main waveguide 21 as delineated therein. As for the frequency converter explained with reference to FIGS. 8 and 9, it is possible to arrange each of crystal detectors 51 and 52 in the sense of the electric field component of the microwaves sent thereto from end opening 41 of main waveguide 21 and to connect choke circuits 55 and 56 additively to the intermediate-frequency amplifier, not shown. Incidentally, it is possible in the frequency converters so far explained to place crystal detectors 51 and 52 asymmetrically with respect to the center plane of main waveguide 21 and to arrange the impedance matching elements accordingly asymmetrically so that the arrangement of crystal detectors 51 and 52 may eventually be electrically symmetric.

Referring to FIG. 14 wherein the abscissa and the ordinate represent frequency and attenuation, respectively, the microwaves entering the frequency converter of the kind disclosed with reference to FIGS. 8 through 13 at end opening 41 of main waveguide 21 undergo notable attenuation as illustrated by curve 61 when the microwaves appear at side opening 26 or at end opening 42 of branch waveguide 28, while microwaves sent into the frequency converter through side opening 26 of main waveguide 21 or end opening 42 of branch waveguide 28 appear at end opening 41 of main waveguide 21 with remarkable attenuation as shown by curve 62. The deviation in the characteristics of crystal detectors 51 and 52 causes a deviation of 2 db above and below to such attenuation.

Referring to FIG. 15, the microwave output of the frequency converter of the type described with reference to FIGS. 8 through 13, when used as a transmission frequency converter, has a stable frequency characteristics over a span of 10 mc. above and below the center frequency $f_0$, as illustrated in FIG. 15 wherein the abscissa and the ordinate represent frequency and output deviation, respectively.

Referring to FIG. 16, V.S.W.R. of the frequency converter of the kind mentioned with reference to FIGS. 8 through 13 as seen from branch waveguide 28 or side opening 26 of main waveguide 21 is less than 1.7 within the frequency range between 3.6 through 4.2 gc., even though consideration may be given to the effects of the fluctuation in the characteristics of crystal detectors 51 and 52.

Referring to FIG. 17, a frequency discriminator wherein this invention is embodied comprises: waveguide devices 71 and 72 of this invention which serve as a magic tee and a frequency converter, respectively, and which have branch waveguides 28 and/or side openings 26 of main waveguides 21, not shown, above described with reference to FIGS. 4 and 5 and others in common; and an interlinking waveguide 76 which interconnects the portions corresponding to end openings 41 of main waveguides 21 mentioned with reference to FIGS. 1 through 3 and others. Interlinking waveguide 76 is longer than branch waveguide 75 which is common to waveguide devices 71 and 72 by an odd multiple of the guided wavelength of the microwaves to be frequency-discriminated. A microwave coaxial cable 43 of waveguide device 71 having the action of a magic tee serves as the input terminal, in the manner of FIGS. 4 and 5, for the input microwaves to be frequency-discriminated. In FIG. 17, a resistor 39 is shown at the position corresponding to the end portion of the inner conductor of the other microwave coaxial cable 44, not shown, but included in FIGS. 4 and 5, of waveguide device 71. Inasmuch as resistor 39 in FIG. 17 acts only as a dummy load, it is possible instead to terminate the other microwave coaxial cable 44 illustrated in FIG. 5 minal for the detected output obtained by the rectifying so as to make the latter cable serve as a dummy load in FIG. 17. Choke circuit 55′ of waveguide device 72 acting as a frequency converter serves as the output terminal for the detected output obtained by the reactifying function of crystal detector 51 and the paired crystal detector 52, not shown, but included in FIGS. 8 through 13. Incidentally, it is obviously possible to use as the waveguide device in FIG. 17 any one of the frequency converters described with reference to FIGS. 8 through 13.

It is understood that the invention herein is described in specific respects for the purpose of this description. It is also understood that such respects are merely illustrative of the application of the principles of the invention. Numerous other arrangements may be devised by those skilled in the art without departing from the spirit and scope of the invention.

What is claimed is:

1. Waveguide apparatus for propagating high frequency current of varying frequencies, comprising:

a first waveguide having an opening in one board wall thereof, said opening being so shaped and so disposed so as to preclude electromagnetic coupling between said waveguide and opening, a second waveguide having an internal opening coextensive with said first waveguide opening and having one end positioned on an external surface of said first waveguide one wall to project said second waveguide outwardly perpendicularly from said last-mentioned surface for registering said second waveguide opening with said first waveguide opening, load means positioned in the interior of said first waveguide in proximity of said opening in said one wall thereof, and impedance means disposed in the interior of said first waveguide in proximity of said opening in said first waveguide one broad wall for establishing matched impedance relations between said first waveguide and opening therein and between said first and second waveguides and between said first and second waveguide and load means, whereby said impedance means is positioned and proportioned in physical size to establish said matched impedance relations.

2. The apparatus according to claim 1 in which said load means includes two discrete loads disposed in spaced relation in a plane normal to said first waveguide one wall and an axis of said first waveguide, said load plane so intersecting said first waveguide that each of said two loads is on a different side of said first waveguide opening, said two loads having opposite terminals connected to said one broad wall and second broad wall opposite thereto of said first waveguide, and in which said impedance means comprises:

a plate disposed in an end of said first waveguide adjacent to said opening therein to short-circuit said last-mentioned end, two tabs, each disposed in said load plane on a different side of said first waveguide opening, and a rod disposed interiorly of said first waveguide on said axis thereof to project normally therefrom and to terminate a free end in proximity of said first waveguide opening, said rod spaced from said tabs and located in proximity of an end of said first waveguide opening opposite to said first waveguide one end including said short-circuiting plate.

3. The apparatus according to claim 1 in which said first waveguide has a rectangular shape and a ratio of the width of opposite broad walls to the width of opposite narrow walls has a value of the order of 4.8 to 1.

4. The apparatus according to claim 2 in which said two discrete loads comprise two spaced coaxial cables, each including an outer and an inner conductor, each of said cables so mounted on an external surface of a second broad wall of said first waveguide as to project outwardly normally therefrom, each of said inner conductors extended into the interior of said first waveguide on a side of said first waveguide opening adjacent to one of said tabs in said load plane.

5. The apparatus according to claim 4 in which one of said inner conductors is so terminated interiorly of said first waveguide as to constitute a dummy load.

6. The apparatus according to claim 4 in which said free end of said rod projects through said first waveguide opening into the interior of said second waveguide.

7. The apparatus according to claim 1 in which said load means includes:

two discrete loads disposed in spaced relation in a plane normal to said first waveguide one wall and an axis of said first waveguide, said load plane so intersecting said first waveguide axis that each of said two loads is on a different side of said first waveguide opening, each of said two loads having one terminal connected to one narrow wall of said first waveguide, and in which said impedance means comprises:

a plate disposed in an end of said first waveguide adjacent to said opening therein to short-circuit said last-mentioned end, a metallic stud having one end disposed on an inner surface of a second broad wall of said first waveguide and projecting normally therefrom on said first waveguide axis, said stud located in proximity of an end of said first waveguide opening opposite to said first waveguide one end and having a free end disposed in proximity of said first waveguide opening, and a metallic rod mounted on said stud free end and extending in parallel with said one and second board walls of said first waveguide, said last-mentioned stud and rod so disposed in a plane normal to said one and second broad walls and intersecting said first waveguide axis that opposite ends of said rod lie on opposite sides of said first waveguide opening, each of said opposite ends of said rod connected to a second terminal of one of said two loads.

8. The apparatus according to claim 1 in which said load means includes:

two non-linear detectors disposed in spaced relation and poled in preselected directions in a plane normal to both said first waveguide one wall and an axis of said first waveguide, said detector plane so intersecting said first waveguide axis that each of said two detectors is disposed on a different side of said first waveguide opening, each of said detectors having one terminal connected to said first waveguide one broad wall, and two coaxial choke circuits for transmitting therethrough alternating current of predetermined frequencies and attenuating therein alternating current of other frequencies, each of said circuits comprising an inner conductor, an intermediate conductor and an outer conductor, each of said inner conductors having one end projecting through a second broad wall of said first waveguide on a different side of said first waveguide opening and connected to a second terminal of one of said detectors, said intermediate and outer conductors connected to an external surface of said first waveguide second broad wall and extending together with said inner conductor normally outwardly therefrom, and in which said impedance means comprises:

a plate disposed in an end of said first waveguide adjacent to said opening therein to short-circuit said last-mentioned end, two tabs positioned between said detectors in said detector plane, each tab being on a different side of said first waveguide opening, and a rod disposed interiorly of said first waveguide on said axis thereof to project normally therefrom and to terminate a free end in proximity of said first waveguide opening, said rod spaced from said tabs and located in proximity of an end of said first waveguide opening opposite to said first waveguide one end.

9. The apparatus according to claim 1 in which said load means includes:

two non-linear detectors disposed in spaced relation with preselected directional poling interiorly of said first waveguide in a plane normal both to said first waveguide one wall and an axis of said first waveguide, said detector plane so intersecting said first waveguide axis that each of said two detectors lies on a different side of said first waveguide opening, each of said detectors having one terminal connected to said first waveguide one broad wall, and a choke circuit positioned exteriorly of said first and second waveguides and having at least one conductor for transmitting therethrough alternating current of predetermined frequencies and attenuating therein alternating current of other frequencies, and in which said impedance means comprises:

a plate disposed in an end of said first waveguide adjacent to said opening therein to short-circuit said last-mentioned end, and an electrical connection positioned interiorly of said first waveguide in said detector plane to extend across said opening in said last-mentioned waveguide in parallel with said first waveguide one wall, each of two opposite ends of said connection joined to a second terminal of one of said two detectors, said connection also having a point between said opposite ends thereof joined to said choke circuit conductor which is projected through said short-circuiting plate into the interior of said first waveguide.

10. The apparatus according to claim 1 in which said load means includes:

two non-linear detectors disposed in spaced relation with preselected poling interiorly of said first waveguide in a plane normal both to said first waveguide one wall and an axis of said first waveguide, said detector plane so intersecting said first waveguide axis that each of said detectors lies on a different side of said first waveguide opening, each of said detectors having one terminal connected to one narrow wall of said first waveguide, and a choke circuit positioned exteriorly of said first and second waveguides and having at least one conductor for transmitting therethrough alternating current of predetermined frequencies and attenuating therein alternating current of other frequencies, and in which said impedance means comprises:

a plate disposed in an end of said first waveguide adjacent to said opening therein to short-circuit said last-mentioned end, and an electrical connection positioned interiorly of said first waveguide in said detector plane to extend across said opening of said last-mentioned waveguide in parallel with said first waveguide one wall, each end of said connection joined to a second terminal of one of said two detectors, said connection also having a point between the ends thereof joined to said choke circuit conductor.

11. The apparatus according to claim 2 in which said opening in said first waveguide is formed along said waveguide axis which constitutes a center plane axis of said first waveguide, said two loads and two tabs are symmetrically disposed on opposite sides of said opening and last-mentioned axis, and said rod is disposed on said first waveguide center plane axis.

12. The apparatus according to claim 2 in which said opening is formed in said first waveguide one wall on an axis of said first waveguide axis which constitutes a center plane axis of said first waveguide, and said two loads and two tabs are asymmetrically disposed on opposite sides of said last-mentioned axis and symmetrically disposed on opposite sides of said opening axis.

13. The apparatus according to claim 1 in which said opening is formed on a center plane axis of said first waveguide, said load means comprises two detectors symmetrically disposed in spaced relation with preselected poling interiorly of said first waveguide on opposite sides of said first waveguide opening, and in which said impedance means is symmetrically disposed intermediate said two detectors in symmetrical relation with respect to said first waveguide center plane axis.

14. The apparatus according to claim 1 in which said opening is formed on an axis of a center plane axis of said first waveguide, said load means comprises two detectors asymmetrically disposed in spaced relation with respect to a center plane axis of said first waveguide, and said impedance means is disposed intermediate said two detectors in asymmetrical relation with respect to said first waveguide center plane axis and in symmetrical relation with respect to an axis of said first waveguide opening.

15. Waveguide apparatus for propagating high frequency alternating current, comprising:

a first hollow waveguide having an opening provided in one broad wall along a center plane axis of said first waveguide, said opening being so shaped and so disposed so as to preclude electromagnetic coupling between said first waveguide and opening, a second hollow waveguide having an internal opening coextensive with said first waveguide opening and having one end positioned on an external surface of said first waveguide one wall to project said second waveguide perpendicularly outwardly from said last-mentioned surface for registering said second waveguide opening with said first waveguide opening, a plurality of loads disposed in spaced relation interiorly of said first waveguide in a plane which is normal both to said first waveguide one wall and axis and which includes an axis of said second waveguide, each of said loads disposed on a different side of said first waveguide opening and axis, and means positioned interiorly of said first waveguide in proximity of said first waveguide opening for establishing matched impedance relations between said first waveguide and opening therein and between said first and second waveguides and between said first and second waveguides and loads, said means comprising:

a plate disposed in an end of said first waveguide adjacent to said opening therein to short-circuit said last-mentioned end, two tabs disposed between said spaced loads in said load plane, each of said tabs disposed on a different side of said first waveguide opening and axis, and a rod disposed interiorly of said first waveguide on said center axis thereof to project normally from said last-mentioned axis and to terminate a free end in proximity of said first waveguide opening, said rod spaced from said tabs and located in proximity of an end of said first waveguide opening opposite to said first waveguide end including said short-circuiting plate, whereby the disposition of said short-circuiting plate and the dispositions and physical sizes of said tabs and rod serve to establish said matched impedance relations.

16. The apparatus according to claim 15 in which said plurality of loads comprises:

two coaxial cables, each including an inner and an outer conductor, said cables mounted in spaced relation on an external surfaces of a second broad wall of said first waveguide to project outwardly normally therefom, each of said inner conductors extended into the interior of said first waveguide on a different side of said first waveguide opening to terminate in proximity of an internal surface of said first waveguide one broad wall, said two inner conductors being disposed in said load plane in the interior of said first waveguide.

17. Waveguide apparatus for propagating high frequency alternating current, comprising:

a first hollow waveguide having an opening provided in one broad wall along a center plane axis of said first waveguide, said opening being so shaped and so disposed so as to prevent electromagnetic coupling between said first waveguide and opening, a second hollow waveguide having an internal opening coextensive with said first waveguide opening and having one end positioned on an external surface of said first waveguide one wall to project said second waveguide perpendicularly outwardly from said last-mentioned surface for registering said second waveguide opening with said first waveguide opening, a plurality of loads disposed in spaced relation interiorly of said first waveguide in a plane which is normal both to said first waveguide one wall and axis and which includes an axis of said second waveguide, said loads disposed on opposite sides of said first waveguide opening and axis, each of said loads having one terminal connected to one narrow wall of said first waveguide, and means positioned interiorly of said first waveguide in proximity of said first waveguide opening for establishing matched impedance relations between said first waveguide and opening therein and between said first and second waveguides and between said first and second waveguides and loads, said means comprising:

a plate disposed in an end of one of said first waveguides adjacent to said opening therein to short-circuit said last-mentioned waveguide end, a metallic stud having one end positioned on an inner surface of a second broad wall of said first waveguide on said center axis thereof so as to project said stud normally therefrom, said stud located in proximity of an end of said first waveguide opening opposite to said first waveguide one end and having a free end disposed in proximity of said first waveguide opening, and a metallic rod mounted on said stud free end and extending in parallel with said one and second broad walls of said first waveguide, said last-mentioned stud and rod so disposed in said load plane that opposite ends of said rod lie on opposite sides of said first waveguide opening and axis, each of said opposite ends of said rod connected to a second terminal of one of said loads, whereby the disposition of said short-circuiting plate and the dispositions and physical sizes of said stud and rod serve to establish said matched impedance relations.

18. Waveguide apparatus for converting high frequency alternating current of one frequency range into alternating current of an intermediate frequency range, comprising:

a first waveguide having an opening in one broad wall along a center plane axis of said waveguide, said opening being so shaped and so disposed so as to preclude electromagnetic coupling between said waveguide and opening, a second waveguide having an internal opening coextensive with said first waveguide opening and having one end positioned on an external surface of said first waveguide one wall to project said second waveguide outwardly perpendicularly from said last-mentioned surface for registering said second waveguide opening with said first waveguide opening, two non-linear detectors disposed in spaced relation and poled in preselected directions in a plane normal both to said first waveguide one wall and axis, said detector plane so intersecting said first waveguide axis that each of said detectors is disposed on a different side of said first waveguide opening, each of said detectors having one terminal connected to said first waveguide one broad wall, two coaxial choke circuits for transmitting therethrough said intermediate alternating current and attenuating said high frequency and other alternating current, each of said circuits comprising an inner conductor, a middle conductor and an outer conductor, each of said inner conductors having one end projecting through a second broad wall of said first waveguide on a different side of said first waveguide opening and axis and connected to a second terminal of one of said detectors, said inner conductors disposed in said detector plane, said middle and outer conductors connected to an external surface of said first waveguide broad wall and extending together with said inner conductor normally outwardly therefrom, and means disposed in the interior of said first waveguide in proximity of said first waveguide opening for establishing matching impedance relations between said first waveguide and opening therein and between said first and second waveguides and between said first and second waveguides and detectors, said means comprising:

a plate disposed in an end of one of said first waveguide adjacent to said opening therein to short-circuit said last-mentioned end, two tabs positioned between said detectors in said detector plane, each tab being on a different side of said waveguide opening and axis, and a rod disposed interiorly of said first waveguide on axis thereof to project normally therefrom and to terminate a free end in proximity of said first waveguide opening, said rod spaced from said tabs and located in proximity of an end of said first waveguide opening opposite to said first waveguide end, whereby the position of said short-circuiting plate together with the positions and physical sizes of said tabs and rod serve to establish said impedance matching relations so that said high frequency current applied to a free end of one of said first and second waveguides and an alternating current of fixed frequency applied to a free end of the other of said first and second waveguides activates said detectors to provide different portions of said intermediate alternating current at said circuits with substantially equal amplitudes.

19. Waveguide apparatus for converting high frequency current of one frequency range into alternating current of an intermediate frequency range, comprising:

a first hollow waveguide having an opening in one broad wall along a center axis of said waveguide so as to prevent electromagnetic coupling between said waveguide and opening, a second waveguide having an internal opening coextensive with said first waveguide opening and having an end positioned on an external surface of said first waveguide one wall to project said second waveguide outwardly perpendicularly from said last-mentioned surface for registering said second waveguide opening with said first waveguide opening, two non-linear detectors disposed in spaced relation and poled in preselected directions in a plane normal to both said first waveguide one wall and axis, said detector plane so intersecting said first waveguide axis that each of said detectors is disposed on a different side of said first waveguide opening, each of said detectors having one terminal connected to said first waveguide one wall, a choke circuit disposed exteriorly of said first and second waveguides and having at least one conductor for selecting said intermediate frequency current, and means disposed in the interior of said first waveguide for establishing impedance matching relations between said first waveguide and opening therein and between said first and second waveguides and between said first and second waveguides and detectors, comprising:

a plate disposed in an end of said first waveguide adjacent to said opening therein for short-circuiting said last-mentioned end, and an electrical connection positioned interiorly of said first waveguide in said detector plane to extend across said opening in said last-mentioned waveguide in parallel with said first waveguide one wall, each of two opposite ends of said connection joined to a second terminal of one of said detectors, said connection also having a point intermediate said opposite ends thereof joined to said choke circuit conductor which is projected into the interior of said first waveguide, whereby the position of said short-circuiting plate together the positions and physical sizes of said connection and conductor serve to establish said impedance matching relations so that said high frequency alternating current applied to a free end of one of said first and second waveguides and an alternating current of predetermined fixed frequency applied to a free end of the other of said first and second waveguides activate said detectors to provide, said intermediate frequency current at said choke circuit.

20. Waveguide apparatus for microwave frequency discrimination, comprising:

first and second hollow waveguides, each having an opening provided in one broad wall along a center plane axis of the associated waveguide and terminated at one end of said last-mentioned broad wall, a third hollow waveguide having an internal opening coextensive with said first and second waveguide openings and having opposite ends mounted on external surfaces of said one broad walls of both said first and second waveguides to project outwardly perpendicularly therefrom for registering said third waveguide internal opening with said first and second waveguide openings, a fourth hollow waveguide interconnecting corresponding ends of said first and second waveguides, said fourth waveguide being longer by an odd multiple of the waveguide wavelength of a center frequency of said microwaves for frequency discrimination than the length of said third waveguide, two non-linear detectors disposed in spaced relation interiorly of said first waveguide in a plane normal to both said first waveguide one wall and axis, said detector plane so intersecting said last-mentioned axis that each of said detectors is disposed on a different side of said first waveguide opening and axis, each detector having one terminal connected to said first waveguide one wall, a choke circuit disposed exteriorly of said first waveguide and having at least one conductor for selecting frequency discriminate alternating current, a coaxial cable comprising inner and outer conductors and mounted on an external surface of a second broad wall of said second waveguide to project outwardly normally therefrom, said inner conductor also projecting through said last-mentioned broad wall into the interior of said second waveguide to terminate in proximity of said second waveguide one wall on one side of said opening therein, a dummy load disposed interiorly of said second waveguide on a side of said opening therein opposite to the side of said last-mentioned opening having said inner conductor, said dummy load connected between said second waveguide one and second walls, said dummy load and said inner conductor in the interior of said second waveguide disposed in a plane normal to said second waveguide one and second walls and a center plane axis of said second waveguide.

and means disposed interiorly of said first and second waveguides for establishing impedance matching relations between each of said first and second waveguides and said respective openings thereof and between each of said first and second waveguides and said third waveguide and between said first and third waveguides and said detectors and between said second and third waveguides and dummy load and coaxial cable, comprising:

a pair of short circuiting plates mounted in free ends of said first and second waveguides adjacent to ends of said respective openings therein, an electrical connection positioned interiorly of said first waveguide in said detector plane to extend across said opening in said last-mentioned waveguide in parallel with said first waveguide one wall, each of two opposite ends of said connection joined to a second terminal of one of said detectors, said connection also having a point between said opposite ends thereof joined to said choke circuit conductor which is projected into the interior of said first waveguide through said short-circuiting plate mounted in said free end thereof, a pair of metallic tabs so disposed in spaced relation intermediate said inner conductor and dummy load in the interior of said second waveguide in said inner conductor and dummy load plane that each of said tabs in disposed on a different side of said second waveguide opening and axis, and a rod disposed interiorly of said second waveguide on said axis thereof the project normally therefrom and to terminate a free end in proximity of said second waveguide opening, said rod spaced from said tabs and located in proximity of an end of said second waveguide opening adjacent to said fourth waveguide, whereby the position of said short-circuiting plate together with the positions and physical dimensions of said connection and conductor in said first waveguide and the position of said short-circuiting plate together with the positions and physical dimensions of said tabs and rod in said second waveguide serve to establish said impedance matching relations so that said microwaves applied to said coaxial cable activate detectors to provide frequency discriminated alternating current at said choke circuit.

References Cited

UNITED STATES PATENTS

| | | | |
|---|---|---|---|
| 2,445,896 | 7/1948 | Tyrrell | 324—58 XR |
| 2,468,166 | 4/1949 | Bruck | 333—11 XR |
| 2,468,237 | 4/1949 | Sanders et al. | 333—11 XR |
| 2,475,474 | 7/1949 | Bruck et al. | 333—11 XR |
| 2,609,447 | 9/1952 | Graef | 333—11 XR |
| 2,679,582 | 5/1954 | Edwards | 333—11 XR |
| 2,689,942 | 9/1954 | Zaleski | 333—11 |
| 2,840,787 | 6/1958 | Adcock et al. | 333—11 |
| 3,192,489 | 6/1965 | Walker et al. | 333—21 XR |
| 3,195,074 | 7/1965 | Rebsch | 333—9 XR |

OTHER REFERENCES

"Microwave Engineering," Harvey, Academic Press, London and New York. 1963, QC 670 H 38, pages 764–766.

"Principles and Applications of Waveguide Transmission," Southworth, D. Van Nostrand, New York, 1961, QC 661 S 68, pages 643–645.

HERMAN KARL SAALBACH, Primary Examiner

M. NUSSBAUM, Assistant Examiner

U.S. Cl. X.R.

329—161; 333—98

PO-1050
(5/69)

UNITED STATES PATENT OFFICE
CERTIFICATE OF CORRECTION

Patent No. 3,509,494 Dated April 28, 1970

Inventor(s) Kawahashi, Takeshi and Kitazume, Susumu

It is certified that error appears in the above-identified patent and that said Letters Patent are hereby corrected as shown below:

Column 5, line 23, delete all of line 23 and insert --matching elements 33, 34 and 36 described with reference--, line 46, "the" should be --these--, and line 59, "characteristics" should be --characteristic--;

Column 6, line 21, delete the entire line (nothing is to be inserted), line 25, "reactifying" should be --rectifying--, and line 41, "board" should be --broad--;

Column 7, line 52, "board" should be --broad--;

Column 10, line 22, "surfaces" should be --surface--, and lines 60 and 61, "waveguides" should be --waveguide--;

Column 13, line 32 "." should be --;--;

Column 14, line 7, "in" should be --is--, and line 10, "the" should be --to--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents